United States Patent

Kohlen

[11] Patent Number: 6,109,133
[45] Date of Patent: Aug. 29, 2000

[54] CONTROL ARRANGEMENT

[75] Inventor: Peter Kohlen, Butzbach, Germany

[73] Assignee: Mannesmann VDO AG, Frankfurt, Germany

[21] Appl. No.: 09/148,548

[22] Filed: Aug. 26, 1998

[30] Foreign Application Priority Data

Aug. 27, 1997 [DE] Germany ............. 197 37 289

[51] Int. Cl.⁷ .................................................. G05G 1/14
[52] U.S. Cl. .............................................. 74/512; 188/74
[58] Field of Search ..................... 74/512, 516, 517; 188/74, 166, 379, 380; 192/41 R

[56] References Cited

U.S. PATENT DOCUMENTS

| | | | |
|---|---|---|---|
| 2,998,211 | 8/1961 | Evans | 74/512 |
| 3,052,421 | 9/1962 | Fischer | 188/74 |
| 3,739,579 | 6/1973 | Lutz | 74/512 |
| 4,120,387 | 10/1978 | Otteblad et al. | 74/512 |
| 4,664,232 | 5/1987 | Takagi et al. | 188/74 |
| 4,949,590 | 8/1990 | Barker et al. | 74/512 |
| 5,033,267 | 7/1991 | Keane | 74/512 |
| 5,133,225 | 7/1992 | Lundberg et al. | 74/512 |
| 5,170,867 | 12/1992 | Ojima et al. | 74/512 |
| 5,555,773 | 9/1996 | Nanno et al. | 74/512 |

FOREIGN PATENT DOCUMENTS

| | | | |
|---|---|---|---|
| 2547385 | 4/1977 | Germany . | |
| 2550326 | 5/1977 | Germany . | |
| 3337664 | 5/1985 | Germany . | |
| 3412318 | 10/1985 | Germany . | |
| 3545940 | 3/1987 | Germany . | |
| 3625282 | 2/1988 | Germany . | |
| 3634-003 | 4/1988 | Germany | 74/512 |
| 195 17 172 | 11/1996 | Germany . | |

*Primary Examiner*—David A. Bucci
*Assistant Examiner*—Chong H. Kim
*Attorney, Agent, or Firm*—Martin A. Farber

[57] ABSTRACT

A control arrangement, in particular a power-control arrangement for engines of vehicles, having an actuating lever (1), in particular a pedal, and a damping device (5–8; 10) which counteracts a movement of the actuating lever (1), comprising a freewheel (9; 16, 17; 18) which at least reduces in one direction of movement the damping force which acts on the actuating lever.

12 Claims, 1 Drawing Sheet

CONTROL ARRANGEMENT

FIELD AND BACKGROUND OF THE INVENTION

The invention relates to a control arrangement, in particular a power-control arrangement for a vehicle engine, having a movable actuating lever, particular a pedal, and a damping device which counteracts movement of the actuating lever. In order to give the operator of such a control arrangement a perceptible indication of force along the displacement of the actuation lever for example, a gas pedal) and to avoid excessive vibration of the arrangement, damping, e.g. by frictional elements, is also provided in addition to a restoring force—usually displayed by a restoring spring. Naturally, such damping is usually the same in both directions of movement, that is to say counter to the restoring force as well. On account of aging, wear or the like, the damping can become excessive, with the result that the control arrangement is only restored slowly or, in the extreme case, not at all.

A damping or braking hysteresis has therefore already been provided between the two directions of movement. One embodiment is described in DE 34 12 318 A1. In this document, frictional elements which can be moved in a translatory manner are subjected to the action of a restoring spring. When the pedal is pressed down, they are pressed against their mating frictional surfaces increasingly the more the spring is stressed, whereas when the movement is reversed the contact-pressure force, and thus the action of friction, are reduced as relaxation of the spring increases. With this arrangement, however, it would be possible for the pairs of frictional elements to wedge against one another as spring force increases.

In another known method of frictional damping for a gas pedal (DE 195 17 172 A1), the pedal-restoring spring is arranged between the pedal itself and a rocker-type braking lever. The latter presses a friction lining onto a rotary bearing sleeve of the pedal lever. The contact-pressure force of the friction lining increases proportionally as the pedal is pressed down further, and decreases correspondingly again when the pedal is released. At the moment the pedal is released (turning point), however, the maximum friction force is still effective temporarily.

In one relevant arrangement with hydraulic displacement transmission (DE 25 50 326 A1) from a pedal-side master cylinder to a control-side slave cylinder, there is a stronger restoring spring on the slave cylinder than on the master cylinder, with the result that the slave cylinder cannot trail when the pedal is relieved of loading. Damping of this arrangement is ensured by the unavoidable flow resistances between the master and slave cylinders; on the other hand, there is no force hysteresis between the pedal being loaded and relieved of loading.

SUMMARY OF THE INVENTION

The object of the invention is to improve the functional reliability of the damping of such a control arrangement.

According to the invention a freewheel is provided which at least reduces the damping force which acts on the actuating lever, in one direction of movement of the actuating lever.

If a freewheel, which is active in the direction in which the pedal is relieved of loading or restored, is provided between the pedal support and the frictional element coupled to the pedal, the movement damping only acts when the pedal is pressed down, while it is at least significantly reduced, or rendered totally ineffective, by the freewheel when the pedal is released. With sufficient damping of pedal vibration, this ensures a spontaneous reaction of the controlled variable—e.g. engine power—to the release of the actuating lever.

This measure also changes the mutual weighting of the restoring force and damping force, because, in combination with a restoring freewheel, the restoring force can be rendered weaker than in previous applications, in which, in addition to the mass of the actuating lever and, if appropriate, bearing-point friction, the restoring force also had to overcome the additional damping force. In contrast, the damping or hysteresis can be enhanced because it no longer has an effect on the restoring movement.

In a rotary frictional arrangement, the pedal-side frictional body, in the same way as in a ratchet, can only be rotated further in one direction, namely when the pedal is pressed down, counter to the friction force, while the frictional body remains in the same position when the pedal is restored. An advantageous secondary effect of this is that, overall, the frictional surface of the frictional body wears to a lesser extent, and uniformly, over its circumference.

A particularly advantageous design of a mechanical freewheel with an extremely small space requirement is a sleeve-type freewheel (e.g. of INA HF 1012 design type produced by a company INA of Herzogenaurach in Germany) which is known per se and is externally constructed like a needle bearing, although its bearing needles act as clamping rollers, and have a locking action, in one direction of rotation.

Depending on the installation conditions, however, it is also possible for other types of freewheels to be used. The important factor in each case is that by the freewheel freedom of movement is provided between the actuating lever or pedal and the damping device such that the damping force does not act counter to the force of the restoring spring or at least from the start has vastly diminished action counter to the force of the restoring spring.

If the damping device acts fluidically/hydraulically (e.g. flow through at least one throttle bore in a piston sliding between two operating chambers), then it is possible to provide therein a freewheel or at least a reduced damping force in one direction of movement by a bypass parallel to the throttle bore, which in a manner known per se, and pressure-controlled by a nonreturn valve (flutter valve), is automatically closed when the actuating lever is loaded, and opened when said lever is relieved of loading, in order to release an enlarged overflow cross section.

The freewheel may also be realized in that, when the actuating lever is relieved of loading, the friction lining is mechanically raised from its frictional surface automatically, following minimal return travel, in order to cancel the friction fit. Such an arrangement could also be provided in a frictional-damping arrangement with translatory relative movement.

BRIEF DESCRIPTION OF THE DRAWING

With the above and other objects and other advantages in view, the present invention will become more clearly understood in connection with basic representations for illustrating arrangements and action of the freewheel as well as the detailed description of preferred embodiments, when considered with the accompanying drawing of which

DETAILED DESCRIPTION OF THE PREFERRED EMBODIMENTS

Figure 1:
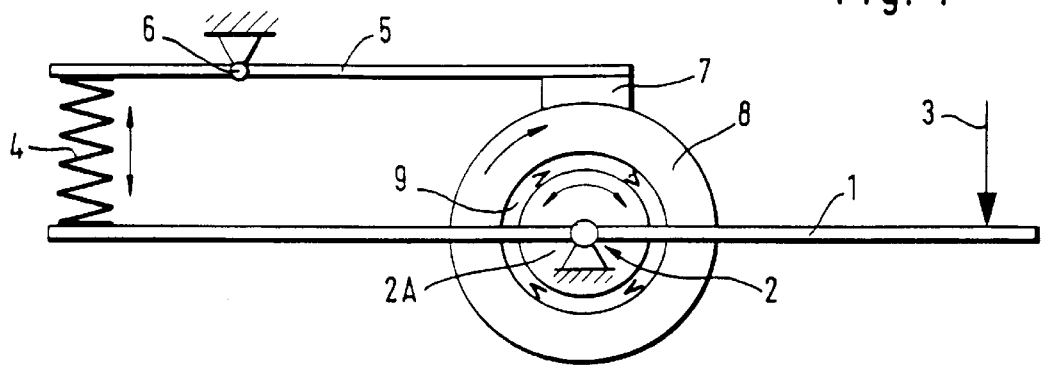
FIG. 1 shows a first embodiment with frictional damping and a mechanical freewheel.

According to FIG. 1, an actuating lever 1 is mounted such that it can be pivoted back and forth about a spindle 2A at a bearing point 2. The actuating lever (e.g. a gas pedal of a motor vehicle) is designed with two arms in this case. An actuating force 3, which is represented by a downwardly oriented arrow on the first (right-hand) arm of the lever, pivots said lever in the clockwise direction counter to the force of a restoring spring 4. The latter is supported—in a manner known per se—in a floating manner between the second (left-hand) arm of the actuating lever 1 and a first (left-hand) arm of a likewise two-armed braking lever 5. The braking lever is, in turn, mounted pivotably at a bearing point 6. A friction lining 7 is arranged on its other (right-hand) arm. The friction lining is pressed by the force of the spring, or the moment exerted about the bearing point 6 by the spring, onto the lateral surface of a cylindrical frictional body 8. The latter can be rotated about the same bearing point 2 as the actuating lever 1. The elements designated 5 to 8 are to be regarded overall as the damping device.

A sleeve-type freewheel 9 is arranged between the frictional body 8 and the spindle 2A of the actuating lever 1. The function of the freewheel is indicated by arrows: the spindle 2A of the actuating lever 1 can be pivoted in both directions, in the clockwise direction by the actuating force 3 and in the counterclockwise direction by the restoring spring 4, as is symbolized by a double arrow. In the clockwise direction, the sleeve-type freewheel 9 carries along the frictional body 8; this is thus its locking direction. This is illustrated by small arrow tips distributed over the circumference of the freewheel and by an arrow on the frictional body. In this case, the friction lining slides over the lateral surface of the frictional body 8.

If, in contrast, only the restoring spring acts, then the actuating lever 1 is guided back in the counterclockwise direction into its basic position, while the frictional body 8 runs freely with respect to the spindle 2A and is secured in its current position by the friction with the friction lining 7. As a result, with each actuation of the actuating lever 1 by a force 3, the frictional body 8 is rotated further by an angle corresponding to the pivot angle of said lever, and thus rotates in steps in the clockwise direction about the spindle 2A.

When the actuating lever 1, designed as a pedal, is pressed down, the friction-damped indication, or force on the foot, which has hitherto been usual in such arrangements is thus maintained. In contrast, when the foot is raised or withdrawn, the pedal follows on without delay as a result of the freewheel. If required, the freewheel itself could be damped slightly in order to avoid rebound of the actuating lever when the latter is suddenly relieved of loading.

It is merely for the sake of simplicity that the power-control elements arranged downstream of the actuating lever are not illustrated, these elements being, for example, an angle or displacement pickup for converting the respective pivot angle into a corresponding electric signal, and the associated evaluating and control means.

Figure 2:
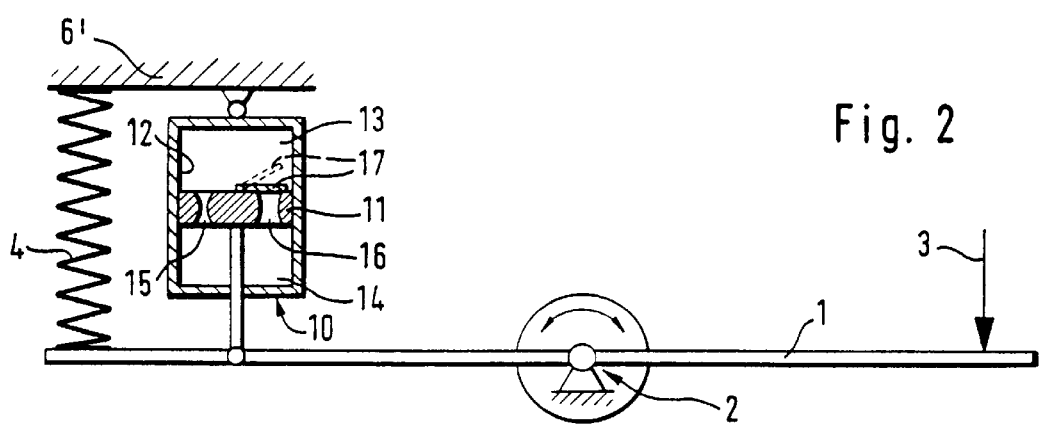
FIG. 2 shows a second embodiment with fluidic damping and a restoring bypass.

In the exemplary embodiment according to FIG. 2, the same parts are designated by the same designations as in FIG. 1. Instead of the friction damping, however, in this case a fluidic damper 10 is supported, parallel to the restoring spring 4, between the left-hand arm of the actuating lever 1 and a fixed support 6'. The function—known per se—of the damper is illustrated schematically: a piston 11 is guided in a sliding manner in a cylinder 12 and subdivides the latter into two chambers 13 and 14. The piston 11 has a throttle bore 15 which, with each movement of the piston 11, permits damped pressure and volume equalization between the chambers. A bypass bore 16 is provided parallel to the throttle bore 15. When the piston 11 is moved upward, said bypass bore is closed off by a nonreturn or flutter valve 17 as a result of the increased pressure in the chamber 13, with the result that volume equalization takes place merely, or essentially, via the throttle bore 15. This is thus the (strongly) damped direction of movement of the actuating lever 1. When the lever is restored by the spring 4, the pressure in the bottom chamber 14 increases straight away and opens the flutter valve acting with bypass bore 16 as a freewheel, with the result that quicker pressure equalization can take place via the bypass. This is thus the freewheeling direction, even if slight damping is maintained. However, as has already been mentioned, this damping may actually be utilized in order to prevent a gas pedal from springing back suddenly. In relation to the restoring spring, the damping will have to be such that the pedal follows withdrawal of the foot without delay.

A gas (e.g. air) or else a suitable liquid can be used as flow medium for the damper 10. If gas is used, the sealing of the damper is not subject to any particular requirements; rather, the compression of the gas may advantageously contribute to increasing the effective restoring force.

Figure 3:
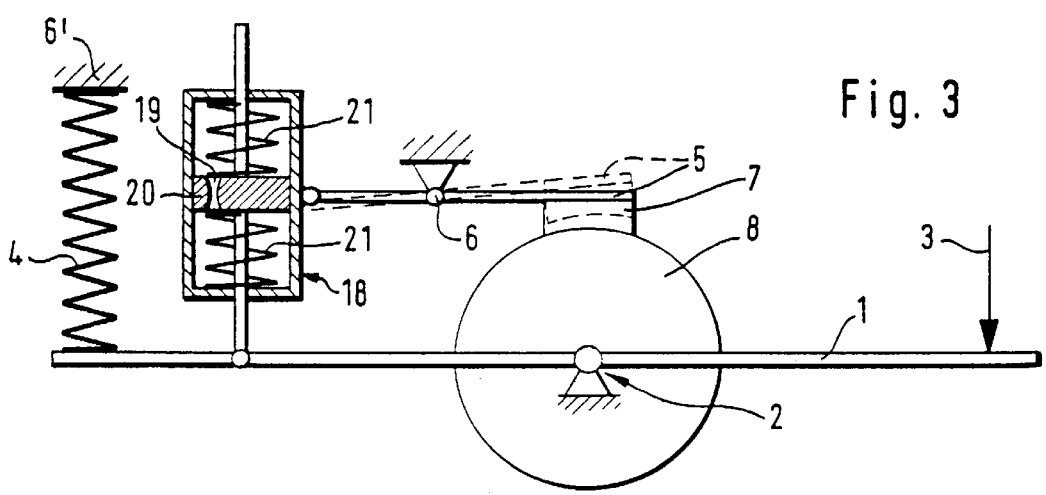
FIG. 3 shows a third embodiment with a device for canceling frictional damping when the actuating lever is restored.

In a third embodiment, shown in FIG. 3, with a mechanical freewheel 18, the restoring spring 4 is supported, analogously to FIG. 2, between the actuating lever 1 and a fixed support 6'. A fluidic damper 18 (basic illustration) with a piston rod on either side is arranged between the actuating lever 1 and the braking lever 5 according to FIG. 1, with the result that the fluid contained can be pumped back and forth via the throttle bore 19 of the piston 20, with complete volume equalization. The frictional body 8 is connected in a rotationally fixed manner to the actuating lever 1 without a freewheel.

In this embodiment, the braking lever 5 can only be pivoted, or subjected to loading, about its bearing point 6 by forces transmitted by the damper 18. Under the action of the actuating force 3, the piston 20 is pressed upward counter to the damping force. In relation to the bearing point 6, a pivot force then acts on the braking lever 5 in the clockwise direction. This pivot force presses the friction lining 7 onto the frictional body 8. When the arrangement is at a standstill, basically no friction force takes effect, nor is it needed.

When the actuating lever 1 is restored by the spring 4, the braking lever is pivoted in the counterclockwise direction by the tensile force which is transmitted temporarily in the damper 18 as a result of the throttled return flow. This means that the friction lining 7 is raised up from the frictional body 8, as indicated by dashed lines. This results in the above-mentioned mechanical canceling of the friction fit, with the result that the actuating lever runs freely and/or can be restored without braking. The amount of travel of the friction lining 7 which is necessary for this purpose is very small.

The damper 18 is preferably made such that its piston is automatically prestressed into a central position—in this case indicated by the springs 21—in order to equalize, by damped restoring movements, differences in length caused by the pumping and to provide length stops on either side.

This means that, even in the rest state, there may be a slight contact-pressure force between the friction lining and the frictional body, but that this force is reliably canceled at the moment when movement is reversed or the lever is relieved of loading.

Overall, the dampers, like the springs, may, of course, be designed such that they can reliably follow even the maximum movements of the actuating lever 1.

The basic illustrations discussed here are not provided as limitations of the structural elements of the control arrangement.

Thus, for example in the embodiment according to FIG. 2, a space-saving combination of the spring 4 and of the damper 10 will be preferred, it being possible for these to be designed coaxially as a spring leg, or the spring being installed in the damper, e.g. in the top operating chamber. If the damper 10 is operated with a fluid filling, then complete volume equalization or corresponding volume buffering of the differential action of the piston should be ensured.

What is claimed is:

1. A control arrangement comprising:

a movable actuating lever;

a damping device providing a damping force acting on and counteracting movement of said actuating lever; and a freewheel at least partially decoupling said damping force in one direction of movement of said actuating levers wherein said damping device comprises a friction lining, and at least one frictional surface engagable with said friction lining, coordinated to said actuating lever and movable synchronously with said actuating lever; and the control arrangement further comprises means for reducing engagement of said frictional surface with said friction lining during a restoring movement of the actuating lever constituting said one direction of movement of the actuating lever.

2. The control arrangement according to claim 1, further comprising a device providing a restoring force with a direction of action which moves said actuating lever in said one direction automatically into a basic position, and said freewheel at least partially decouples said damping force in said one direction of movement.

3. The control arrangement according to claim 1, wherein said damping device comprises at least one frictional surface which is associated with said actuating lever and is movable synchronously with the actuating lever, and wherein said freewheel is arranged between said actuating lever and said frictional surface.

4. The control arrangement according to claim 3, wherein said freewheel is a sleeve-type freewheel.

5. The control arrangement according to claim 1, wherein said freewheel is a ratchet-type freewheel.

6. The control arrangement according to claim 3, further comprising a spindle connected to said actuating lever, wherein said damping device comprises a cylindrical frictional body mounted for joint rotation with said actuating lever and said freewheel on said spindle, and wherein the frictional surface is a lateral surface of said cylindrical frictional body.

7. The control arrangement according to claim 1, wherein said damping device comprises a friction lining, and at least one frictional surface engagable with said friction lining, coordinated to the actuating lever and movable synchronously with said actuating lever, and wherein said freewheel comprises means for mechanically raising said friction lining automatically away from said frictional surface during a restoring movement of the actuating lever constituting said one direction of movement of the actuating lever.

8. The control arrangement according to claim 1, wherein the actuating lever is a pedal.

9. The control arrangement according to claim 1, wherein the actuating lever is a pedal for a power-control arrangement for a vehicle engine.

10. The control arrangement according to claim 2, wherein said damping force is eliminated in said one direction.

11. The control arrangement according to claim 1, further comprising a device providing a restoring force with a direction of action which moves said actuating lever in said one direction automatically into a basic position, and said freewheel isolates said damping force from acting on said actuating lever in said one direction of movement.

12. A control arrangement comprising:

a movable actuating lever;

a damping device providing a damping force acting on and counteracting movement of said actuating lever; and means for at least reducing said damping force in one direction of movement of said actuating lever;

wherein said damping device comprises a friction lining, and at least one frictional surface engagable with said friction lining, coordinated to said actuating lever and movable synchronously with said actuating lever; and said means mechanically raises said friction lining automatically away from said frictional surface during a restoring movement of the actuating lever constituting said one direction of movement of the actuating lever.

* * * * *